United States Patent Office 2,708,978
Patented May 24, 1955

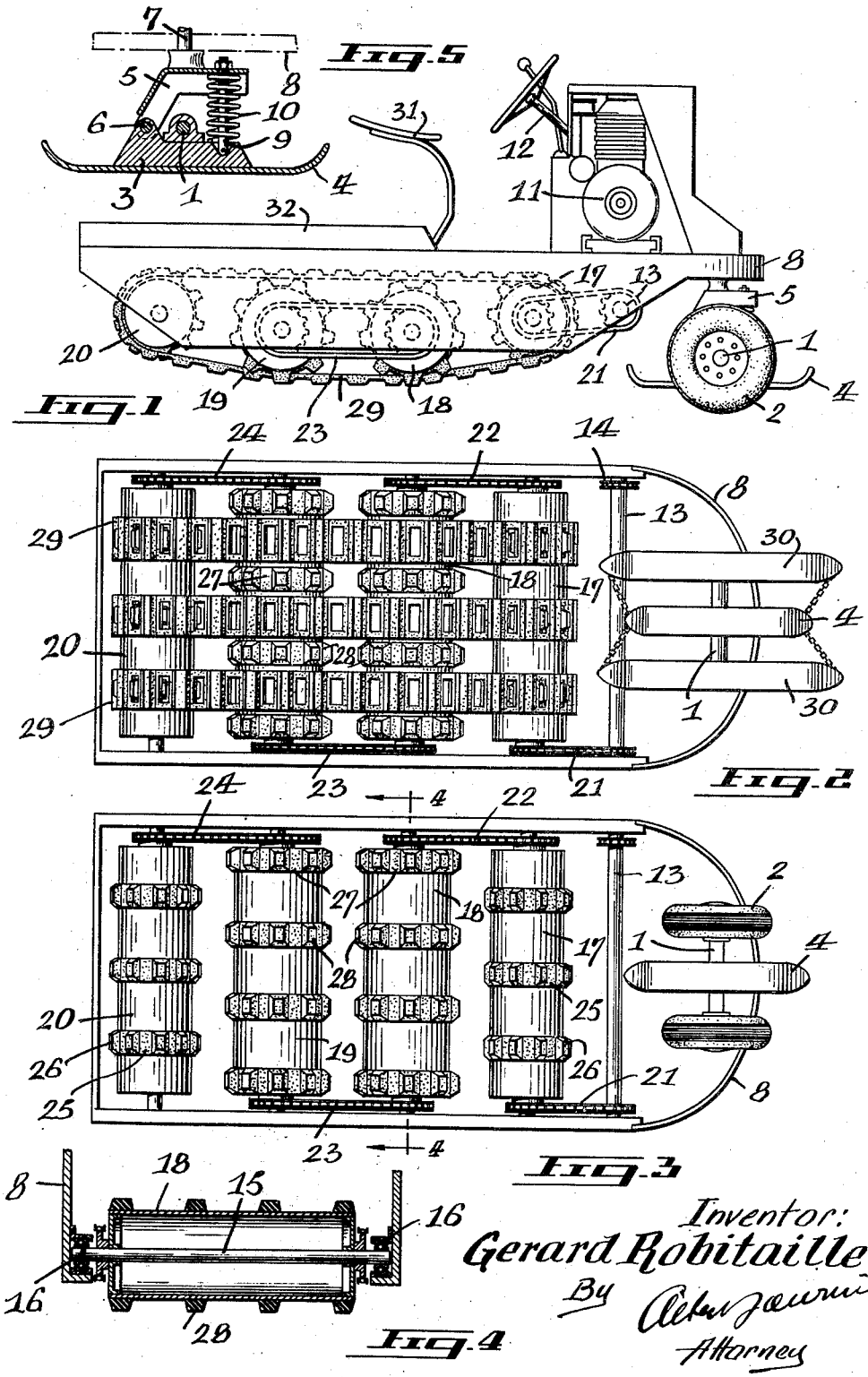

2,708,978

VEHICLE TRACTION RING AND ENDLESS TREAD ARRANGEMENT FOR CONVERTIBLE TRACTION

Gérard Robitaille, Quebec, Quebec, Canada

Application April 12, 1954, Serial No. 422,525

2 Claims. (Cl. 180—9.1)

The present invention pertains to a novel vehicle convertible for summer and winter use and also adopted to travel on rough terrain, as in the woods.

The principal object of the invention is to provide a small and inexpensive vehicle for the purpose set forth. In the woods, personal conveyance or the carrying of a light load requires one or two horses and the invention provides a small runabout motor vehicle for the same purposes.

The objects of the invention are accomplished by means of a vehicle having a series of traction drums transverse of the body. The drive from the motor is carried partially along both ends of the drums for balanced distribution of the torque.

The drums carry toothed traction rings which provide sufficient traction on hard ground. For travel on soft ground, snow, traction treads are spanned from the first drum of series to the last, over the rings therein. The rings on the intermediate drums are staggered with respect to those on the end drums and are therefore not engaged by the traction treads.

The invention is fully disclosed by way of example in the following description and in the accompanying drawings in which:

Figure 1 is a side elevation of the device;

Figure 2 is a bottom plan view showing the treads applied;

Figure 3 is a bottom plan view without the treads;

Figure 4 is a section on the line 4—4 of Figure 3; and

Figure 5 is a detail longitudinal section.

Reference to these views will now be made by use of like characters which are employed to designate corresponding parts throughout.

In Figures 2, 3 and 5 is shown a front axle 1 carrying forward wheels 2. A block 3 is also mounted on the axle and carries a runner 4 normally elevated from the wheels as shown in Figure 1. A bracket 5 is pivotally attached to the block 3 at 6 and carries a king pin 7 on which is mounted the forward end of a body 8. A pin 9 extending from the bracket 5 to the block is surrounded by a cushioning spring 10. On the forward end of the body 8 is supported a motor 11 and steering apparatus 12.

A drive shaft 13 across the front of the body is driven from the motor by a chain 14. A number of transverse shafts 15 journalled in bearings 16 along the length of the body 8 carry drums 17, 18, 19 and 20. Along one side of the body, shaft 13 is chain geared at 21 to the shaft of drum 17, and the shafts of drums 17 and 18 are chain geared together at 22. Along the other side of the body the shafts of drums 18 and 19 are chain geared together at 23, and the shafts of drums 19 and 20 are chain geared together at 24. Thus, a staggered drive is provided from shaft 13 through the several drums and is balanced or equally divided between both sides of the body 8.

On the drums 17 and 20 are mounted three spaced cog rings 25 alined on the respective drum and formed with cogs or teeth 26. The rings and teeth are formed of suitable material such as hard rubber. Similar cog rings 27 are secured on the drums 18 and 19, alined on the respective drums but staggered with respect to the rings 25 on drums 17 and 20. The rings 27 carry cogs or teeth 28 in the manner described.

For winter use or other hard usage, endless treads 29 are trained over the alined rings 25 of the cylinders 17 and 20 as shown in Figure 2 straddling the rings 27 of rollers 18 and 19. The wheels 2 may remain and are prevented by the runner 4 from sinking too deep. When the snow or mud is deep, it is preferred however to replace the wheels with runners 30 as shown in Figure 2.

It will now be seen that the invention provides a simple and rugged vehicle for use on rough and soft terrain, as in the woods. It is intended primarily for small loads such as personnel or cargo on the seat 31 and deck 32 of the body, although it may be provided in larger sizes. In the small size it serves the purpose of a runabout and is cheaper than the present least expensive motor vehicle.

Although a specific embodiment of the invention has been illustrated and described, it will be understood that various alterations in the details of construction may be made without departing from the scope of the invention as indicated by the appended claims.

What I claim is:

1. A motor vehicle comprising a body, a series of drums journalled transversely and spaced longitudinally of said body, spaced traction rings on the end drums and alined from drum to drum, spaced traction rings on the intervening drums and staggered with respect to the rings of said end drums, endless tread members adapted to be trained over the alined rings of the end drums and to traverse the spaces between the remaining rings, and means for driving said drums.

2. A motor vehicle comprising a body, a series of drums journalled transversely and spaced longitudinally of said body, spaced traction rings on the end drums and alined from drum to drum, spaced traction rings on the intervening drums and staggered with respect to the rings of said end drums, endless tread members adapted to be trained over the alined rings of the end drums and to traverse the spaces between the remaining rings, a drive shaft at one end of said series, a motor for driving said shaft, and gearing from said shaft to the successive drums, said gearing being distributed at both ends of said drums and staggered from side to side of said body.

References Cited in the file of this patent

UNITED STATES PATENTS

| | | |
|---|---|---|
| 999,971 | Eckley | Aug. 8, 1911 |
| 1,232,414 | Wallis | July 3, 1917 |
| 2,141,530 | Guidroz | Dec. 27, 1938 |
| 2,226,182 | Ross | Dec. 24, 1940 |
| 2,410,465 | Small | Nov. 5, 1946 |
| 2,617,659 | Grenier | Nov. 11, 1952 |